US012793204B2

(12) United States Patent
Obiagwu

(10) Patent No.: US 12,793,204 B2
(45) Date of Patent: Nov. 10, 2026

(54) SYSTEM AND METHOD FOR WIDGET LOAD FAILURE IDENTIFICATION

(71) Applicant: NCR VOYIX Corporation, Atlanta, GA (US)

(72) Inventor: Francis Obiagwu, Katy, TX (US)

(73) Assignee: NCR Voyix Corporation, Atlanta, GA (US)

( * ) Notice: Subject to any disclaimer, the term of this patent is extended or adjusted under 35 U.S.C. 154(b) by 198 days.

(21) Appl. No.: 18/400,355

(22) Filed: Dec. 29, 2023

(65) Prior Publication Data

US 2025/0217963 A1 Jul. 3, 2025

(51) Int. Cl.
*G06T 7/00* (2017.01)

(52) U.S. Cl.
CPC .................................... *G06T 7/001* (2013.01)

(58) Field of Classification Search
CPC .... G06T 7/001; G06F 11/0751; G06F 11/366; G06F 11/302
See application file for complete search history.

(56) References Cited

U.S. PATENT DOCUMENTS

2020/0005210 A1 1/2020 Nacu, Jr. et al.
2020/0327008 A1 10/2020 Singh et al.
2021/0081294 A1* 3/2021 Golubev .............. G06N 3/0464
2023/0027855 A1 1/2023 Dheeraj Raju

OTHER PUBLICATIONS

Vos, Tanja E. J et al. “Testar—Scriptless Testing through Graphical User Interface.” Software testing, verification & reliability 31.3 (2021): n. pag. Web. (Year: 2021).*
Eskonen, Juha, Julen Kahles, and Joel Reijonen. “Automating GUI Testing with Image-Based Deep Reinforcement Learning.” 2020 IEEE International Conference on Autonomic Computing and Self-Organizing Systems (ACSOS). IEEE, 2020. 160-167. Web. (Year: 2020).*
Apr. 16, 2025 Search Report in corresponding European Patent Appl. No. EP24211704A.
European Examination Report for European Patent Application No. 24211704.2, Dated Apr. 1, 2026.

* cited by examiner

*Primary Examiner* — John R Wallace
(74) *Attorney, Agent, or Firm* — Notaro, Michalos & Zaccaria P.C.; John S. Economou

(57) ABSTRACT

A system and method for the detection of widget load failure is described. A widget load failure detection module detects when a widget on a web page failed to load based on a received screenshot of the web page. For widget load failure detection, the module uses a machine learning model that is trained using a plurality of annotated web page screenshots. A computing device is coupled to a web server and provides synthetic monitoring of web pages supplied by the web server. A processor executes executable instructions that cause the processor to: load a web page from the web server for analysis, capture a screenshot of the web page, forward the screenshot of the web page to the widget load failure detection module for analysis, and receive a response from the widget load failure detection module indicating whether any widget on the web page failed to load.

8 Claims, 2 Drawing Sheets

SYSTEM AND METHOD FOR WIDGET LOAD FAILURE IDENTIFICATION

FIELD

This disclosure relates generally to a system and method for widget load failure identification, and more particularly to a system and method for widget load failure identification using a machine learning model.

BACKGROUND

Synthetic monitoring systems have been used to monitor website operation, for example, to confirm that a website successfully loads when called. Identifying website load failures is an important part of the troubleshooting process for resolving any issues causing such failures. Websites often use web widgets to provide access to third party content and services. Although many types of website load failures can be readily identified by a synthetic monitoring system, it can be difficult to identify when a web widget fails to load on a monitored website.

The present disclosure describes a technical solution that solves the above-noted technical problem.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
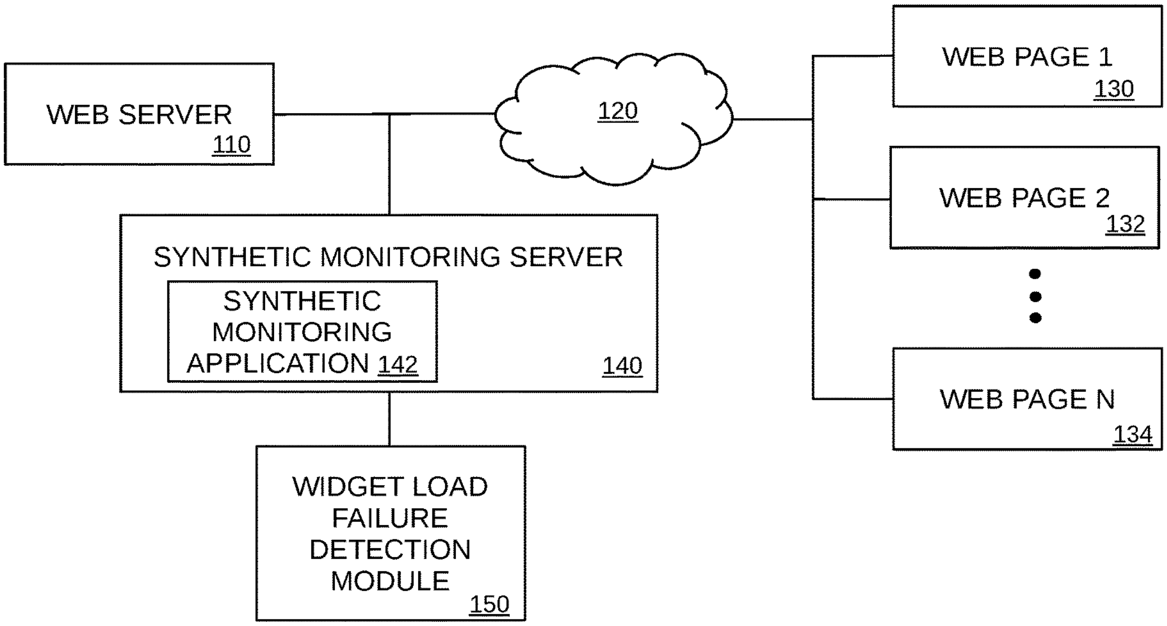
FIG. 1 is a block diagram of a synthetic monitoring system employing a machine learning model module for identifying widget load failures according to an aspect of the current disclosure.

Referring now to FIG. 1, a web server 110 is shown coupled to a network 120 that is a wide area network such as the Internet. As known in the art, the web server 110 consists of computer software and underlying hardware (as discussed with respect to FIG. 2) that accepts user requests over the network 120 via, for example, the Hypertext Transfer Protocol (HTTP) or its secure variant HTTPS. A user agent, commonly a web browser or web crawler, initiates communication with the web server 110 by making a request for a web page or other resource using HTTP, and the web server 110 responds with the requested content/resource (or an error message). In many cases, a provider may use a web server to provide web sites (organized groups of web pages) for multiple customers that rely on such sites to provide online services (e.g., online banking). Web server 110 may provide N different websites for its various customers, so that users may be able to load web page 1 130, web page 2 132, and up to web page N 134 on remote computers (or any other web-enabled devices) via network 120 using appropriate requests. It is important to ensure that such websites remain operational, and providers often use synthetic monitoring, such as via a synthetic monitoring server 140, to continually test each provided website. The synthetic monitoring server 140 actively tests each provided website periodically by simulating visitor requests to determine availability, performance, and functionality—by selectively loading web pages periodically, for example.

As explained above, it is difficult for a synthetic monitoring server to determine whether any widgets provided as part of a website page load properly. To address this technical problem, the system and method of the present disclosure adds a widget load failure detection module 150. In operation and as discussed in more detail below, each time the synthetic monitoring server 140 simulates a customer load of one of the monitored websites provided by web server 110, a screenshot of the page (e.g., the homepage) is provided to the widget load failure detection module 150 for analysis and a determination as to whether the one or more widgets on that page loaded properly.

Figure 2:
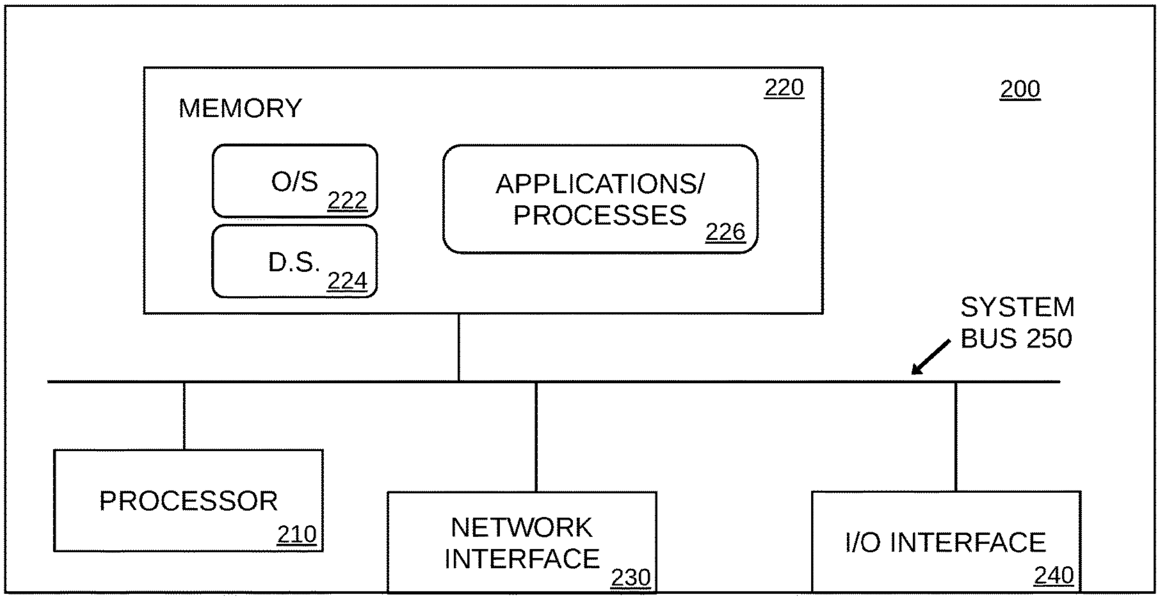
FIG. 2 is a schematic block diagram of an example computing system for the synthetic monitoring system of the current disclosure.

FIG. 2 is a schematic block diagram of an example computing system or device 200 that may be used with one or more embodiments described herein, e.g., as any of the devices such as web server 110, synthetic monitoring server 140, and the widget load failure detection module 150 shown in FIG. 1. Device 200 may include at least one processor 210, a memory 220, one or more network interfaces 230 (e.g., wired, wireless, etc.), and one or more input/output (I/O) interfaces 240, which may be interconnected by a system bus 250. The network interface(s) 230 and the I/O interface(s) 240 are referred to in the singular hereinafter for ease of explanation.

The network interface 230 contains the necessary circuitry for communicating data over links coupled to the network 120. The network interface 230 may be configured to transmit and/or receive data using a variety of different communication protocols. Note, further, that configuration of device 200 shown in FIG. 2 is merely illustrative, and device 200 may have multiple types of network connections via multiple network interfaces 230, e.g., wireless and wired/physical connections.

The memory 220 may include a plurality of storage locations that are addressable by the processor 210 and the network interface 230 for storing software programs and data structures associated with the embodiments described herein. The processor 210 may comprise hardware elements or hardware logic adapted to execute software programs and manipulate the data structures 224. An operating system 222, portions of which are typically resident in memory 220 and executed by the processor 210, functionally organizes the device 200 by, among other things, invoking operations in support of software processes and/or services executing on the device 200. These software processes and/or services may include one or more applications/processes 226.

The input/output (I/O) interface 240 may not be present in all embodiments (e.g., when the device 200 is a cloud-based server), but when present, typically includes a user interface (UI) that has an input device, such as an alpha-numeric keypad (e.g., a keyboard) for inputting alpha-numeric and other information, a pointing device (e.g., a mouse, a trackball, stylus, or cursor direction keys), a touchscreen, a microphone, a camera, and so forth. Additionally, output devices may include speakers, printers, particular network interfaces, monitors, etc.

The widget load failure detection module 150 utilizes a widget detection machine learning model. This model may be integrated with a synthetic monitoring application 142 running on the synthetic monitoring server 140 or may run on a separate server coupled to the synthetic monitoring server 140. The model identifies any widgets that have successfully loaded on a particular webpage provided thereto via, e.g., a screenshot thereof, and any widgets that have failed to load on that particular webpage. The model works through a process of image annotation, training, and object detection.

Figure 3:
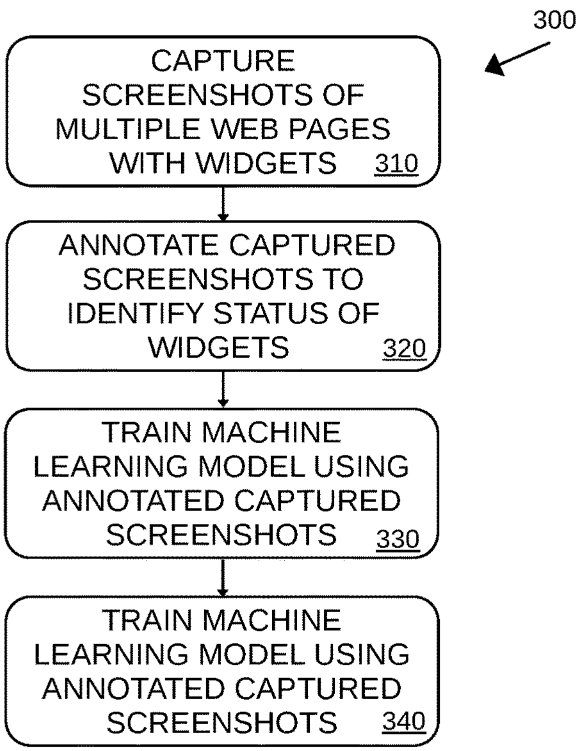
FIG. 3 is a flowchart of a method for developing a machine learning model for identifying widget load failures according to an aspect of the current disclosure.

Referring now to FIG. 3, the flowchart 300 shows the development of the widget detection machine learning model. First, at step 310, screenshots of a plurality of web pages are captured. Next, at step 320, the captured website images are annotated to identify those widgets that successfully (correctly) loaded and those that did not. Then, at step 330, the annotated captured website images are used to train the machine learning model. Finally, at step 340, the trained model is tested to ensure that it provides accurate and efficient detection of failed widgets when called (e.g., when a screenshot of a website is provided as input to the trained model) by a particular application, e.g., the synthetic monitoring application 142.

Figure 4:
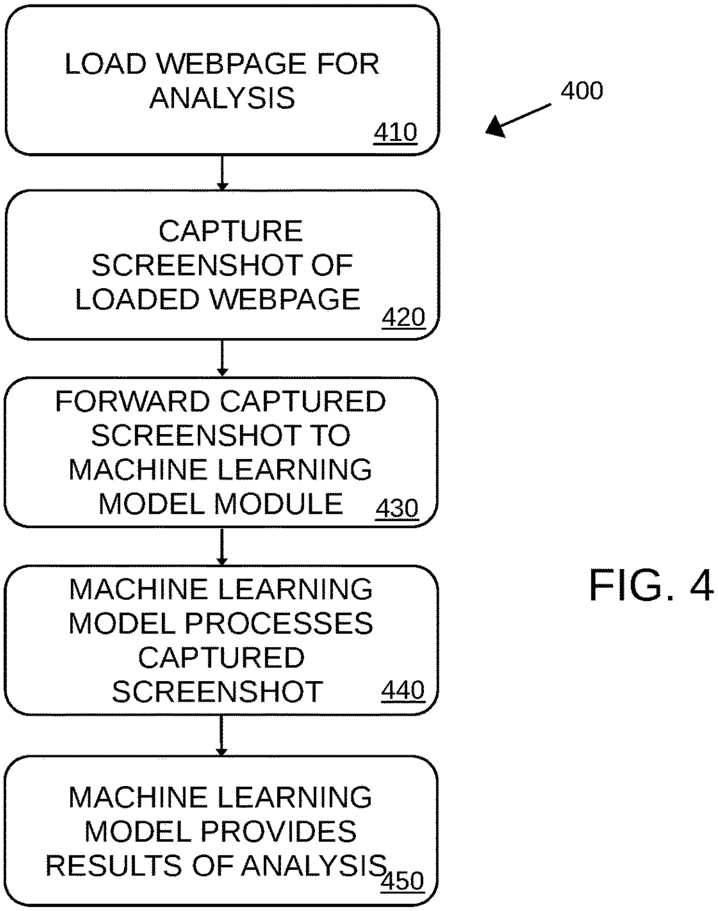
FIG. 4 is a flowchart of a synthetic monitoring method employing a machine learning model for identifying widget load failures according to the current disclosure.

The operation of the synthetic monitoring application 142 in terms of widget failure detection is shown in the flowchart 400 shown in FIG. 4. First, at step 410, the synthetic monitoring application 142 (running, for example, on synthetic monitoring server 140) loads a particular webpage for analysis. Next, at step 420, a screenshot of the particular webpage is generated after loading. The screenshot is provided to the machine language-based widget load failure detection module 150 at step 430. The machine language-based widget load failure detection module 150 processes the received screenshot at step 440. The machine language-based widget load failure detection module 150 then provides a response to the synthetic monitoring application 142 at step 450 indicating whether any of the widgets on the webpage corresponding to the provided screenshot failed to load.

Use of the above-described machine learning model in the widget load failure detection module 150 during synthetic monitoring offers numerous advantages, including improved accuracy, time savings, cost savings, and scalability. By accurately identifying widgets that fail to load properly, this model provides more accurate information for troubleshooting and resolving issues, which can save valuable time and costs. The automated nature of this model allows for quicker and more efficient identification of widgets that have failed to load, making it a scalable solution that can accommodate increasing testing demands.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system, comprising:

a web server coupled to a wide area network for supplying web pages based on user requests via the wide area network, at least one of the web pages including at least one widget;

a widget load failure detection module for detecting when a widget on a web page failed to load based on a received screenshot of the web page, the widget load failure detection module using a machine learning model to determine, from the received screenshot, for each widget on the web page whether the widget loaded properly or failed to load properly; and a computing device coupled to the web server and configured to provide synthetic monitoring of the web pages supplied by the web server, the computing device having a processor and a non-transitory computer-readable storage medium, the non-transitory computer-readable storage medium including executable instructions that, when executed by the processor, cause the processor to:

selectively load a web page from the web server for analysis, capture a screenshot of the selectively loaded web page, forward the screenshot of the selectively loaded web page to the widget load failure detection module for analysis, and receive a response from the widget load failure detection module indicating whether any widget on the web page failed to load properly;

wherein the synthetic monitoring simulates user access to the web pages supplied by the web server by periodically loading the web pages independent of user requests.

2. The system of claim 1, wherein the machine learning model is trained using a plurality of annotated web page screenshots that include annotations that identify, for each widget in the screenshots, whether the widget loaded properly or failed to load properly.

3. The system of claim 1, wherein the widget load failure detection module is executed on a server separate from the computing device providing the synthetic monitoring.

4. The system of claim 1, wherein the machine learning model determines whether each widget loaded properly or failed to load properly using object detection on the screenshot.

5. The system of claim 1, wherein the response identifies one or more specific widgets that failed to load properly.

6. A method, comprising:

generating a plurality of web page screenshots for web pages supplied by a web server;

annotating the plurality of web page screenshots for the web pages supplied by the web server to identify, for each widget, whether the widget loaded properly or failed to load properly;

training a machine learning model to determine, based on a received screenshot of a web page, for each widget on the web page whether the widget loaded properly or failed to load properly; and synthetically monitoring the web pages supplied by the web server by:

selectively loading a web page from the web server for analysis, capturing a screenshot of the selectively loaded web page, forward the screenshot of the selectively loaded web page to the machine learning model for analysis, and receiving a response from the machine learning model indicating, for each widget on the web page, whether the widget loaded properly or failed to load properly; and wherein the synthetic monitoring comprises simulating user access to the web pages by periodically loading the web pages independent of user requests.

7. The method of claim 6, wherein the machine learning model is trained using a plurality of annotated web page screenshots that include annotations that identify, for each widget in the screenshots, whether the widget loaded properly or failed to load properly.

8. The method of claim 6, wherein determining whether each widget loaded properly or failed to load properly comprises performing object detection on the screenshot.

* * * * *